(No Model.)
W. F. SINGER.
CARBURETOR.
No. 324,177. Patented Aug. 11, 1885.
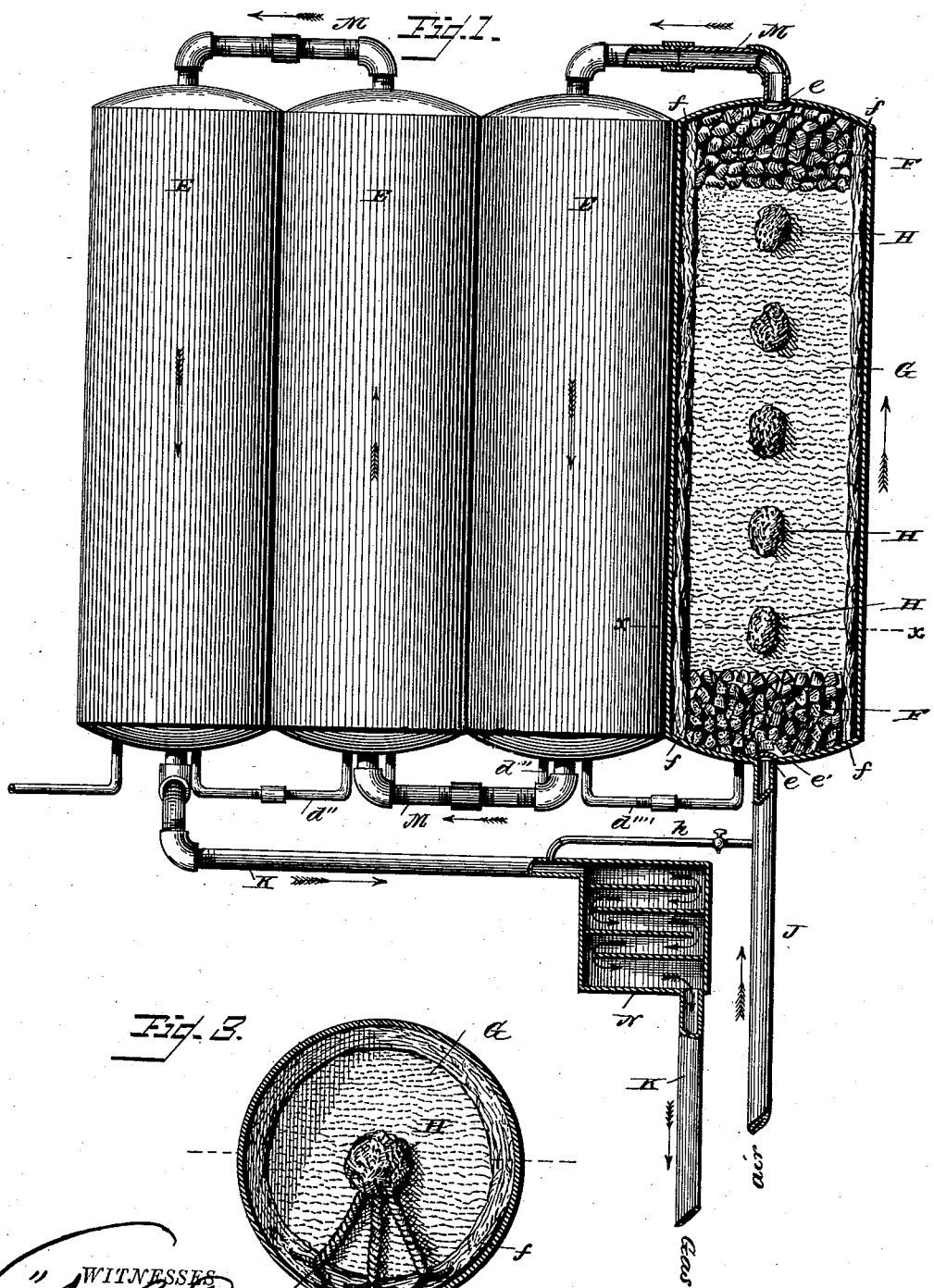

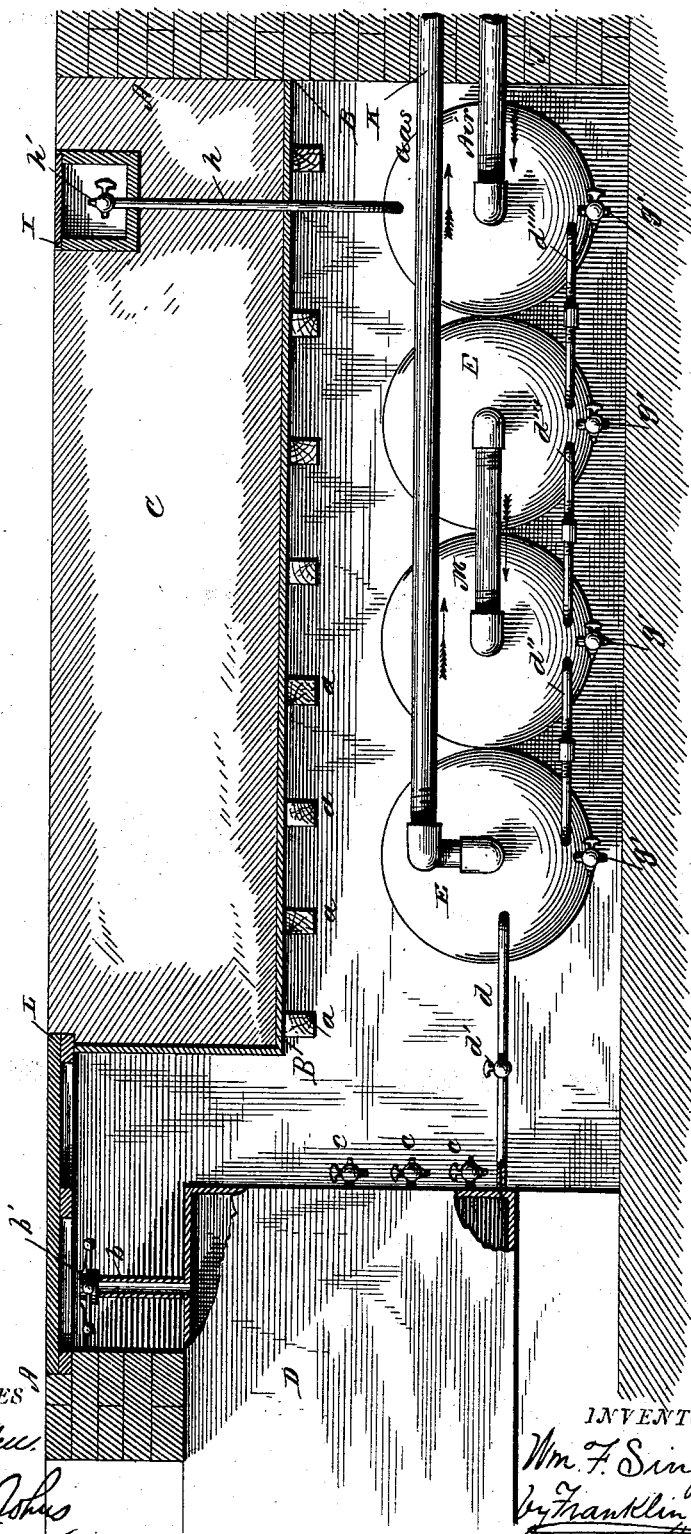

UNITED STATES PATENT OFFICE.

WILLIAM F. SINGER, OF CARTHAGE, NEW YORK.

CARBURETOR.

SPECIFICATION forming part of Letters Patent No. 324,177, dated August 11, 1885.

Application filed November 29, 1884. (No model.)

*To all whom it may concern:*

Be it known that I, WILLIAM F. SINGER, a citizen of the United States, residing at Carthage, in the county of Jefferson and State of New York, have invented certain new and useful Improvements in Carburetors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Like letters refer to similar parts throughout the several views.

My invention relates to carburetors, and has for its object to provide a series of detachable carburetors, each complete in itself, and so constructed and arranged as to admit of its being readily attached or removed from the series, as the number of burners to be supplied with gas may at any time be either increased or diminished.

The further object of my invention is to provide an air-tight storage-tank for the gasoline or other hydrocarbon used, and provide the same with a means of automatically regulating the supply of hydrocarbon to the carburetors.

I accomplish these objects in the manner hereinafter described.

In the accompanying drawings, Figure 1 is a plan view of a series of my improved carburetors, one of which is shown in section. Fig. 2 is an end elevation of a series of carburetors arranged within the vault with storage-tank connected. Fig. 3 is a section of one of the carburetors, taken through the line $x$ $x$ of Fig. 1.

Referring to the drawings, A A represent the walls of the vault in which the carbureting apparatus is placed. B is a flooring resting upon the sleepers $a$ $a$, and forming a support for the covering of earth, which is shown at C.

The air-tight storage-tank D, which is preferably cylindrical in form, is provided with the inlet-pipe $b$, through which it may be filled. The entrance to the pipe $b$ may be hermetically closed by means of the cap $b'$, which is packed with soft lead, and is screwed down upon the upper end of the pipe, the outer edge of which is provided with a screw-thread adapted to receive it. The cap is provided with arms or projections, which will permit the same to be adjusted without the use of a wrench, which would be likely to bruise the soft metal of which the same is composed. The end of the tank adjacent to the carburetors is provided with a series of three or more gage-cocks, $c$ $c$ $c$. When in position the bottom of the tank should be upon a level slightly below that of a horizontal line passing through the centers of the carburetors, and the pipe $d$, provided with the valve $d'$, furnishes the means of communicating the hydrocarbon to the first of the series of carburetors, from which the remainder of the series is supplied through the pipes $d''$ $d'''$ $d''''$.

The carburetors E E, sectional views of one of which are shown in Figs. 1 and 3 of the drawings, may be of any desired form, though I have found the cylindrical form shown in the drawings to be preferable. They are provided at each end with a suitable opening, $e$, for the passage of the air, the openings being covered by a screen, $e'$, of perforated copper or other metal, in order to prevent particles of the capillary material from escaping into the pipes. The interior surface of each of the carburetors is provided with a lining of raw cotton, $f$, the lining being several inches in thickness, and the ends are packed with broken coke, F, to a depth of from twelve to sixteen inches. I have found a packing of fifteen inches to give the best results.

That portion of the interior of the carburetor intermediate of the packing of coke at its ends is filled with sawdust, (shown at G,) and is provided with a series of sponges, H, arranged along a line drawn longitudinally through the center of the carburetor. Each of the sponges is attached to the cotton lining $f$ at the bottom of the carburetor, at one or more points, by means of the wicks $g$ $g$, made of some suitable fibrous material—as, for instance, "candle-wicking." Each of the carburetors is provided at one of its ends with a waste cock, $g'$, and one of the carburetors in the series used is provided with the vent-pipe $h$, which enters the top of the carburetor and extends upward to near the surface of the ground. The pipe $h$ is provided with the cock $h'$, which, when opened, will allow the gas to escape from the carburetor. Air is admitted through the air-inlet pipe J, and, after passing through the carburetors, is conveyed by means of the pipe K to the place where it is desired for use. The trap L furnishes a means of access to both the storage-tank and the carburetors.

In operating the device the storage-tank D is filled with gasoline or other hydrocarbon, and the cap $b'$ secured in its place. The cock $h'$ is then opened to allow the escape of the gas from the carburetors. The hydrocarbon flows from the storage-tank D through the pipe $d$ into the first of the series of carburetors, and thence through the pipes $d''$, $d'''$, and $d''''$ into those adjacent. After a sufficient quantity has entered the carburetors to fill the same to the level of the pipe $d$ the cock $h'$ is closed, and as the tank D is an air-tight compartment, the flow will necessarily cease when the supply in the carburetors is sufficient to cover the entrance of the pipe $d$.

Air is forced through the pipe J by any of the various air-pumps suitable for the purpose, and, entering the first of the series of carburetors through the opening $e$ in the end of the same, it passes successively through the layers of coke and sawdust, and by means of the pipe M it enters the next adjoining carburetor, through which it passes. The course of the air is thus continued through the several cylinders or chambers constituting the series of carburetors, and enters the outlet-pipe J, through which it is conveyed to the point where it is to be consumed.

It sometimes happens when the carburetors have been freshly supplied with hydrocarbon that the air, in passing through the series of carburetors, will become too heavily charged with carbon, and it becomes necessary to dilute the same by the admixture of fresh air. To accomplish this object any of the various devices adapted to such use may be provided, in connection with the carbureted-air-outlet pipe J. I have shown such a mixer at N, the air being admitted from the air-inlet pipe K through the pipe $k$.

The number of carburetors used in a series may be varied, the same depending upon the number of lights to be supplied with gas. If it is desired at any time to discontinue the use of one or more of the carburetors, either for repair or for the purpose of diminishing the supply of gas, it may be readily detached from the series and the remaining carburetors continued in use.

It is at once evident that the arrangement of the sponges and attachment of the same by means of wicks to the lining at the bottom of the carburetor will greatly aid the capillary material in absorption of the hydrocarbon.

The coke packing at the ends of the carburetors serves the purpose of condensing both the gas and air, and thus preventing moisture from entering the pipes.

One air-pump may, by means of pipes suitably arranged, be used for supplying air to several carburetors located at a distance from each other, and thus in cases in which several consumers in a neighborhood desire to use separate carburetors the expense of maintaining a single air-pump may be shared among them.

Cotton or other material may be used in place of sponges within the sawdust packing of the carburetors. Sponges are preferred, however, because it is believed that the best results are to be obtained by their use.

Having thus described my invention, what I claim to be new, and desire to secure by Letters Patent, is—

1. In a carburetor, a carbureting-chamber having a lining of cotton, the portion of the interior intermediate of the ends filled with sawdust, and a series of sponges attached to the lining by means of wicks, substantially as and for the purpose specified.

2. A carbureting-chamber having its inner sides lined with cotton, the openings at its ends covered with metallic screens, a packing of coke at each end, the portion of the chamber intermediate of the ends filled with sawdust, and having a series of sponges or other absorbent material arranged within the body of the sawdust, the sponges being attached to the lining of the carburetor by means of wicks, substantially as and for the purpose specified.

3. A series of detachable carburetors communicating with each other at their ends by means of pipes, having an air-inlet pipe, a pipe for the passage of gas from the carburetor, and a vent-pipe, each of the carburetors having its inner side lined with cotton, the openings at the ends covered with a screen, the ends packed with coke, the portion of the interior intermediate of the ends filled with sawdust, and having a series of sponges or equivalent absorbent material arranged within the body of the sawdust and attached to the cotton lining by means of capillary material, substantially as described.

4. The combination of a series of detachable carburetors communicating with each other by means of pipes, having an air-inlet pipe, a gas-exit pipe, and a vent-pipe, each of the carburetors having its inner sides lined with cotton, the openings at the ends covered with a screen, the ends packed with coke, the portion of the interior intermediate of the ends filled with sawdust, having a series of sponges or equivalent absorbent material arranged within the body of the sawdust and attached to the cotton lining by means of wicks, with an air-tight storage-tank provided with an air-inlet pipe having an air-tight cover, a series of gage-pipes, and an outlet-pipe, substantially as and for the purpose specified.

In testimony whereof I affix my signature in presence of two witnesses.

W. F. SINGER.

Witnesses:
H. W. BOYER,
E. D. EAMES.